(12) United States Patent
Hasegawa et al.

(10) Patent No.: US 6,563,781 B2
(45) Date of Patent: May 13, 2003

(54) OPTICAL INFORMATION STORAGE DEVICE AND OPTICAL HEAD

(75) Inventors: Shinya Hasegawa, Kawasaki (JP); Wataru Odajima, Kawasaki (JP); Nobuhide Aoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/097,317

(22) Filed: Mar. 14, 2002

(65) Prior Publication Data

US 2002/0093903 A1 Jul. 18, 2002

Related U.S. Application Data

(63) Continuation of application No. PCT/JP99/06284, filed on Nov. 11, 1999.

(51) Int. Cl.[7] .................................................. G11B 7/00
(52) U.S. Cl. ................. 369/118; 369/44.23; 369/44.24; 369/112.01
(58) Field of Search ........................... 369/44.11, 44.12, 369/44.23, 44.24, 44.27, 112.01, 112.02, 112.22, 112.27, 118

(56) References Cited

U.S. PATENT DOCUMENTS 4,742,219 A * 5/1988 Ando ...................... 369/44.23
5,910,937 A * 6/1999 Akiba et al. .............. 369/44.24

FOREIGN PATENT DOCUMENTS

| JP | 62-112245 | 5/1987 |
| JP | 63-063137 | 3/1988 |
| JP | 63-083929 | 4/1988 |
| JP | 01-232581 | 9/1989 |
| JP | 5-189796 | 6/1993 |
| JP | 7-192279 | 7/1995 |
| JP | 9-223324 | 8/1997 |
| JP | 10-162443 | 6/1998 |
| JP | 10-320826 | 12/1998 |

* cited by examiner

*Primary Examiner*—Muhammad Edun
(74) *Attorney, Agent, or Firm*—Greer, Burns & Crain, Ltd.

(57) ABSTRACT

It is an object of the present invention to provide an optical information storage device capable of performing stable information accessing at a high recording density, and an optical head, and the optical information storage device and the optical head of the present invention comprise: a light shielding body held in a position close to/in contact with a surface of a recording medium, and provided with a slit adapted to intersect a track of the recording medium by an angle α of 45° or lower; condensing means for condensing a light emitted from a light source on the slit of the light shielding body; and moving means for moving the light S condensed on the slit by the condensing means along the slit.

7 Claims, 8 Drawing Sheets

OPTICAL INFORMATION STORAGE DEVICE AND OPTICAL HEAD

This is a continuation of International PCT application No. PCT/JP99/06284 filed Nov. 11, 1999.

TECHNICAL FIELD

The present invention relates to an optical information storage device for accessing information by irradiating a light on a surface of a recording medium, and an optical head used for such an information storage device.

BACKGROUND ART

Conventionally, as a medium for storing a voice, image information, a character, a computer program or the like, an optical disk such as a CD, a CD-ROM, a CD-R, a DVD, a PD or an MO, has been known. An optical information storage device has also been known, which forms a condensing spot by using the optical head to condense a laser beam or the like on such an optical disk, and accesses the optical disk by using the condensing spot. Such an optical information storage device is now a focus of attention because of portability of a recording medium, a large capacity and a light weight. With achievement of higher performance of a computer in recent years, there is a demand for a great increase in an information recording density by such an optical information storage device.

The information recording density by the above-described optical information storage device is higher as a size of the condensing spot on the optical disk is smaller. Thus, developments of a shorter wavelength laser beam source, and studies of a higher NA of an objective lens have been actively conducted. Regarding achievement of the higher NA of the objective lens, there has been known a method for realizing an objective lens, which has a numerical aperture set to exceed 1 and reach about 1.4 by condensing a light in a medium of a high refractive index, as in the case of an oil immersion lens of an optical microscope. However, the size of the condensing spot cannot be greatly reduced by the shorter wavelength of the laser beam source or the higher NA of the objective lens, and thus it is difficult to greatly increase the recording density. In addition, a technology has been presented, which physically forms a condensing spot of a smaller size by using a pinhole. However, in the technology using the pinhole, a quantity of light is small, efficiency of light utilization is 0.1% or lower, and positioning of the condensing spot with respect to the pinhole is difficult. Thus, there are difficulties of stable information accessing, high-speed information transferring and reproducing. Moreover, during tracking, the condensing spot and the pinhole must be translated at a high speed. However, it is difficult to realize a low-priced actuator or the like for moving the pinhole at a high speed.

With respect to the foregoing technologies, a magneto-optical recording technology based on a laser pulse magnetic field modulation system has been presented, which records information by a mark length smaller than the size of the condensing spot. To greatly increase the recording density, narrowing of a track pitch is essential. In the above-described magneto-optical recording technology, however, it is impossible to narrow such a track pitch.

DISCLOSURE OF THE INVENTION

The present invention has been developed to solve the foregoing problems, and an object of the present invention is to provide an optical information storage device capable of performing stable information accessing at a high recording density, and an optical head.

In order to achieve the foregoing object, in accordance with a fist aspect of the present invention, there is provided an optical information storage device for performing information access by irradiating a light on a surface of a recording medium, the recording medium having a track irradiated with the light to at least reproduce information, comprising:

a medium holding section for holding the recording medium in a predetermined position; and an optical head for irradiating the light on the surface of the recording medium held by the medium holding section, wherein the optical head includes
a light source for emitting a light,
a light shielding body provided with a slit,
a light shielding body holding section for holding the light shielding body in a position close to/in contact with the surface of the recording medium such that the slit of the light shielding body intersects the track by an angle of 45° or lower,
condensing means for condensing the light emitted from the light source on the slit of the light shielding body, and
moving means for moving the light condensed on the slit by the condensing means along the slit.

According to the optical information storage device of the first aspect in the present invention, preferably, the holding section holds the light shielding body such that the slit of the light shielding body intersects the track by an angle of 5° or lower.

In order to achieve the foregoing object, in accordance with a second aspect of the present invention, there is provided an optical information storage device for performing information access by irradiating a light on a surface of a recording medium, the recording medium having a plurality of linear tracks provided at predetermined intervals on the surface and irradiated with the light to access information, comprising:

a medium holding section for holding the recording medium in a predetermined position; and an optical head for irradiating the light on the surface of the recording medium held by the medium holding section, wherein the optical head includes
a light source for emitting a light,
a light shielding body provided with a slit,
a light shielding body holding section for holding the light shielding body in a position close to/in contact with the surface of the recording medium such that the slit of the light shielding body intersects the tracks by an angle of 45° or lower,
condensing means for condensing the light emitted from the light source on the slit of the light shielding body, and
moving means for moving the light condensed on the slit by the condensing means along the slit by changing an incident angle of the light made incident on the condensing means, and
a following relationship is established among an interval Tp between the tracks, a focal distance f of the condensing means, a minimum changing amount $\Delta\theta$ of angle changed by the moving means, and an angle $\alpha$ of intersection of the slit with respect to the tracks:

$Tp/(\sin \alpha \cdot f \cdot \Delta\theta) \geq 10$

In this case, any tracks can be used as long as they allow information to be linearly recorded. The tracks are not limited to those physically formed as grooves, and tracks formed only magnetically or optically on a plane may also be used.

The "slit" means an optical slit. Any slits can be used as long as they diaphragm luminous fluxes only in a predetermined direction, and a slit having a light transmitting portion filled with a transparent material such as glass may also be used.

In addition, the light shielding body holding section may be a carriage moving on a rail, or a swing arm rotating around a predetermined point of view. The carriage or the swing arm may hold a slider having the light shielding body loaded.

According to the optical information storage device of each of the first and second aspects of the present invention, since the slit intersecting the track by the foregoing angle physically reduces a size of the condensing spot in a slit width direction, a track pitch can be narrowed. As a result, it is possible to perform information accessing at a high recording density. Especially, by using the device in combination with a magneto-optical recording technology based on a laser pulse magnetic field modulation system, a very high recording density can be realized. Because of no eclipsing of the condensing spot and no losses of efficiency of light utilization in a longitudinal direction of the slit, the efficiency of light utilization is high, and the recording medium can be irradiated with a sufficient quantity of light. As a result, it is possible to perform stable information accessing and high-speed data transferring. Moreover, since the light condensed on the slit is moved along the slit by the moving means, tracking accuracy is high in a direction orthogonal to the track, and thus it is possible to perform meticulous tracking control.

According to the optical information storage device of each of the first and second aspects of the present invention, preferably, the condensing means of the optical head condenses the light to be in a long elliptic shape in a direction parallel to the track of the recording medium. Because of such an elliptic shape of the condensing spot, accuracy of positioning the condensing spot with respect to the slit in the direction parallel to the track may be lowered.

In addition, if the condensing means of the optical head condenses the light to be in such an elliptic shape, preferably, the condensing means includes a cylindrical lens provided on the slit of the light shielding body so as to direct a bus in a direction orthogonal to the track of the recording medium, and the light is condensed through the cylindrical lens. Furthermore, preferably, the light source emits infrared rays, the light shielding body is made of silicon, and the condensing means includes a cylindrical lens made of a semiconductor transmitting the infrared rays.

The condensing means forming the condensing spot in the elliptic shape can be realized in a simple structure by using the cylindrical lens. In addition, the light shielding body and the cylindrical lens made of the foregoing materials can be mass-produced inexpensively by using a photoetching technology or the like.

In order to achieve the foregoing object, in accordance with the present invention, there is provided an optical head comprising: a light source for emitting a light;

a light shielding body provided with a slit for guiding a light to a surface of a recording medium;

condensing means for condensing the light emitted from the light source on the slit of the light shielding body; and moving means for moving the light condensed on the slit by the condensing means along the slit.

The optical head of the present invention is used for an optical storage device, and the slit provided in the light shielding body of the optical head intersects the track of the recording medium by the foregoing angle, and thus, it is possible to perform stable information accessing a high recording density.

In addition, according to the optical head of the present invention, preferably, the slit provided in the light shielding body has a width set equal to or less than ½ of a wavelength of the light emitted from the light source. Because of the slit provided to have such a width, a light called near light is oozed out from the slit to form a fine spot, making it possible to access information at a much higher recording density.

Furthermore, according to the optical head of the present invention, a coil may be provided along the slit of the light shielding body held in the position close to/in contact with the surface of the recording surface.

To generate a magnetic field necessary for magneto-optical recording by a laser pulse magnetic field modulation system on the surface of the recording medium, the coil must be brought close to about 10 μm from the surface of the recording medium. The foregoing coil can be brought sufficiently close to the surface of the recording medium.

As described above, according to the optical information storage device and the optical head of the present invention, it is possible to perform stable information accessing at a high recording density.

BEST MODES FOR CARRYING OUT THE INVENTION

Next, description will be made of an optical information storage device according to an embodiment of the present invention, including an optical head of an embodiment of the present invention.

Figure 1:
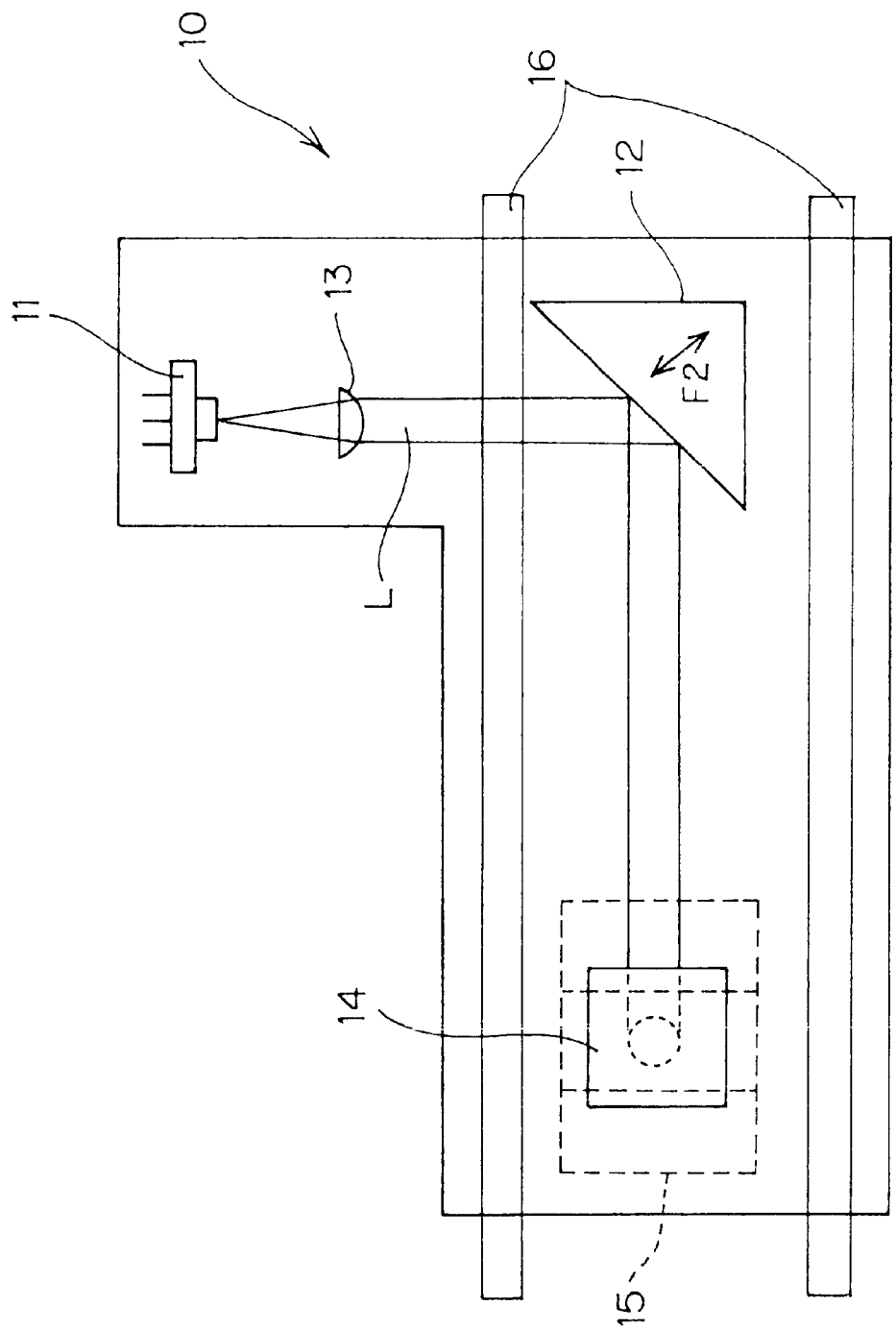
FIG. 1 is a front view of an optical head included in an optical information storage device according to an embodiment.
Figure 2:
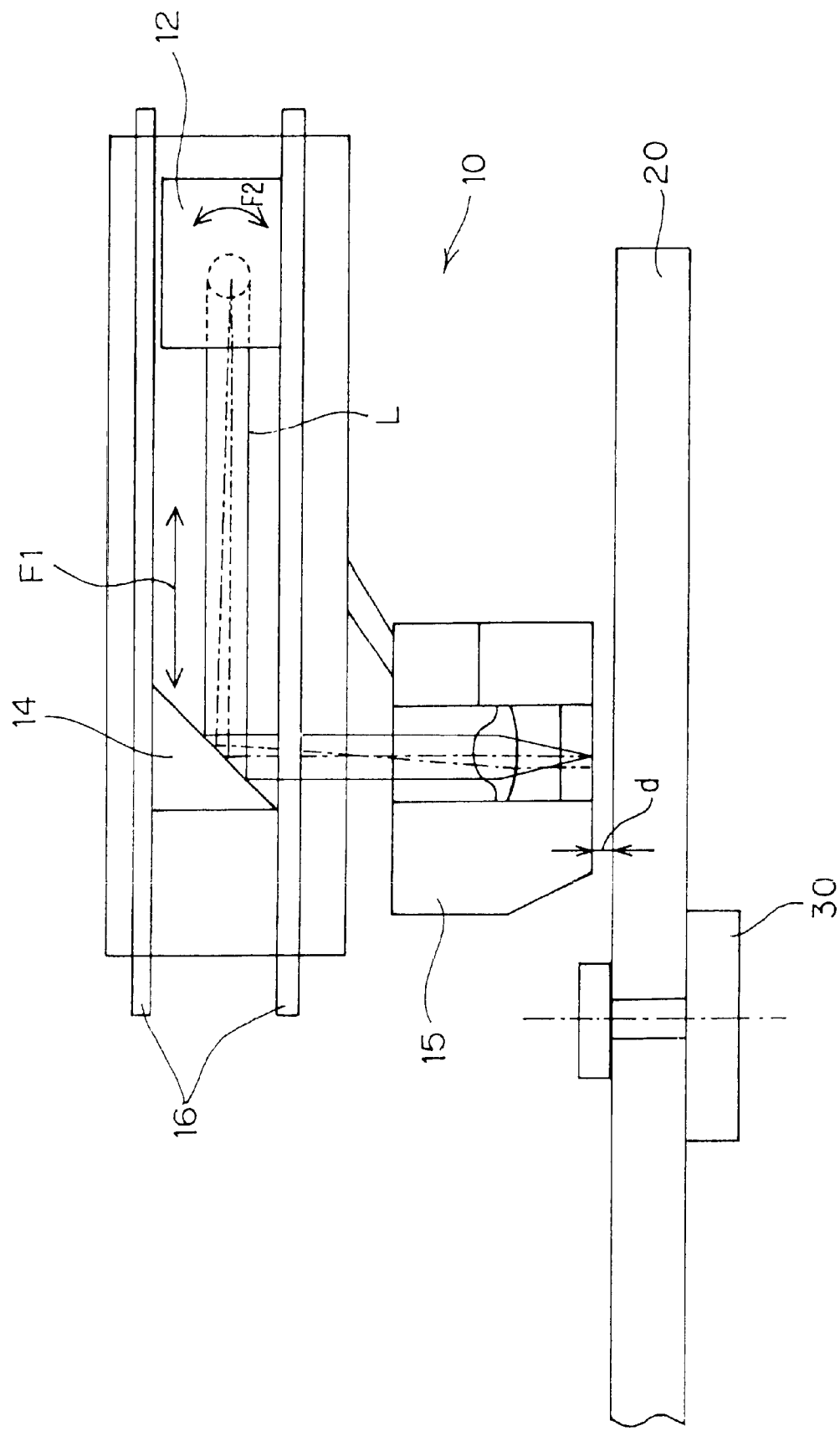
FIG. 2 is a side view of the optical head included in the optical information storage device of the embodiment.

FIG. 1 is a front view of the optical head included in the optical information storage device of the embodiment; and FIG. 2 a side view of the optical head.

This optical head 10 includes a semiconductor laser 11 as an example of a light source of the present invention. Other than the semiconductor laser 11 as the light source of the present invention, an LED or the like is conceivable. The optical head 10 also includes a freely rotatable galvanomirror 12 as an example of moving means of the present invention. The galvanomirror 12 has a predetermined rotary shaft. A driving system of the galvanomirror 12 may be an electromagnetic type or an electrostatic type.

Laser beams L emitted from the semiconductor layer 11 are set to be parallel beams by a collimation lens 13, reflected by the galvanomirror 12, further reflected by a reflecting mirror 14, and then guided to a surface of a magneto-optical disk 20 as an example of a recording medium of the present invention. The magneto-optical disk 20 is rotated while being held in a predetermined position by a medium holding section 30 of the optical information storage device.

The optical head 10 further includes a slider 15 on which condensing means and a light shielding body of the present invention are loaded. This slider 15 is floated from the surface of the magneto-optical disk 20 by a very narrow gap d. The laser beams L are condensed on the surface of the magneto-optical disk 20 by the condensing means to form a condensing spot. A detailed structure of the slider 15 will be described later.

On the surface of the magneto-optical disk 20, tracks for storing information are provided concentric-circularly. By moving the optical head 10 on rails 16 as indicated by an arrow F1, a seeking operation is carried out to move the slider 15 to a desired track on the magneto-optical disk 20. By rotating the galvanomirror 20 as indicated by an arrow F2, a so-called tracking operation is carried out to hold the condensing spot on the desired track.

Figure 3:
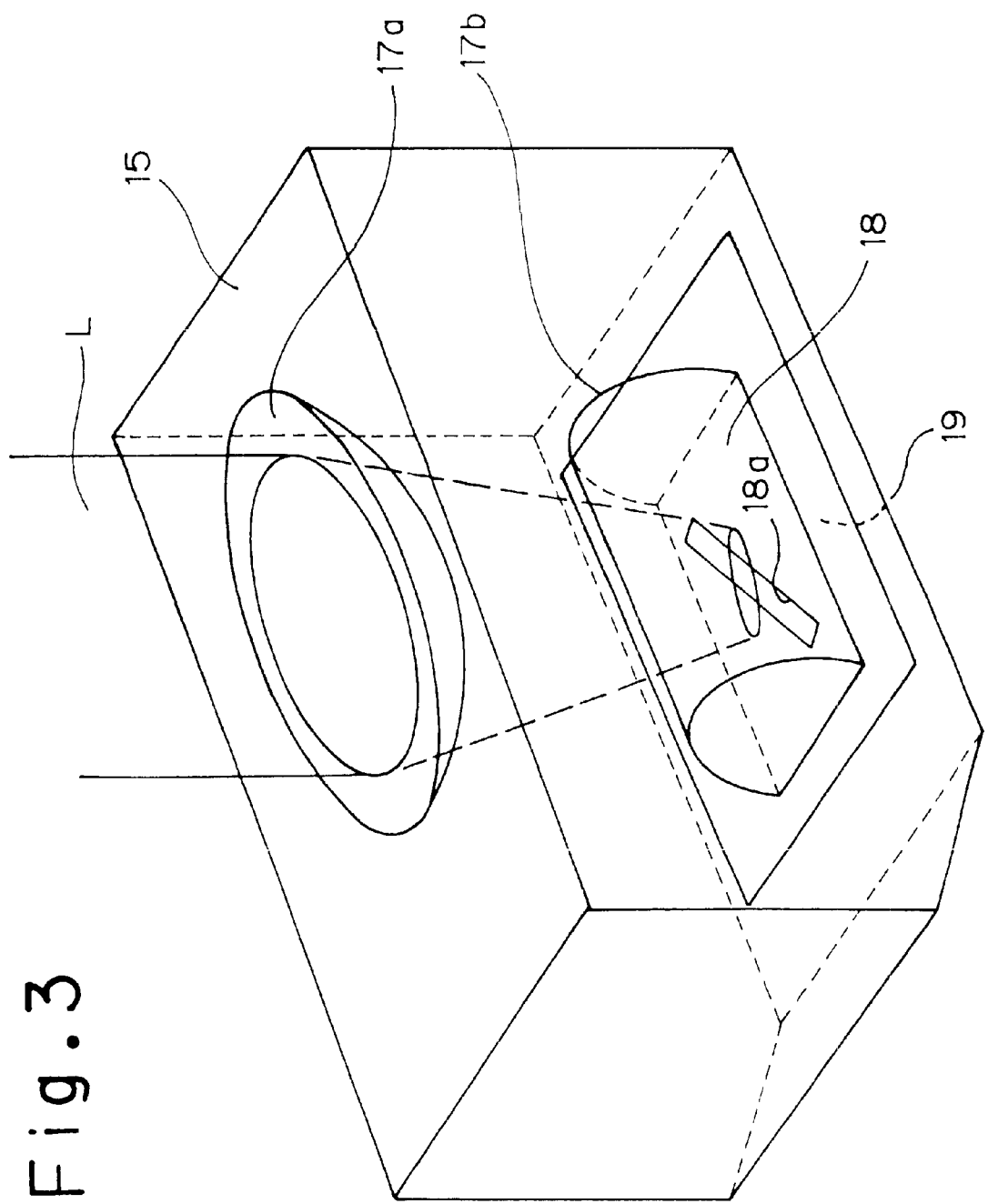
FIG. 3 is a perspective view showing a detailed structure of a slider.

FIG. 3 is a perspective view showing the detailed structure of the slider 15.

On the slider 15, a condensing lens 17a and a cylindrical lens 17b are loaded, which constitute an example of the condensing means of the present invention. Here, the cylindrical lens 17b is loaded such that a bus is parallel to the track on the optical disk. The slider 15 also includes a light shielding film 18 formed as an example of a light shielding body of the present invention. A slit 18a is provided in the light shielding film 18. In addition, a plane coil 19 is provided along the light shielding film 18.

The laser beams L reflected by the reflecting mirror 14 shown in FIGS. 1 and 2 are converged by the condensing lens 17a while circular sections thereof are maintained, and further converged by the cylindrical lens 17b only in a direction orthogonal to the track of the magneto-optical disk to form an elliptic condensing spot on the slit 18a of the light shielding film 18. Of the laser beams L, only a portion passed through the slit 18a is radiated onto the magneto-optical disk. Thus, a size of the condensing spot is physically reduced by the slit 18a. A width W (see FIG. 5) of the slit 18a is equal to or less than ½ of a wavelength of the laser beam. By using the light shielding film having the slit 18a having such a width W, light passing through the slit 18a forms a spot of a very small size in the direction orthogonal to the track. As a result, a spot size that cannot be realized in the conventional art using an SIL or the like is realized, making it possible to realize a much higher recording density. Moreover, since the beam passed through the slit 18a is radiated onto the magneto-optical disk to be used for information accessing, a sufficient quantity of light for information accessing can be obtained, making it possible to perform stable information accessing.

In this case, a magneto-optical recording technology based on a laser pulse magnetic field modulation system is employed. The laser beams L modulated in pulse shapes of predetermined time intervals are radiated, and a recording magnetic field having a polarity reversed according to information to be recorded is generated by the plane coil 19 to form a mark on the optical disk.

Figure 4:
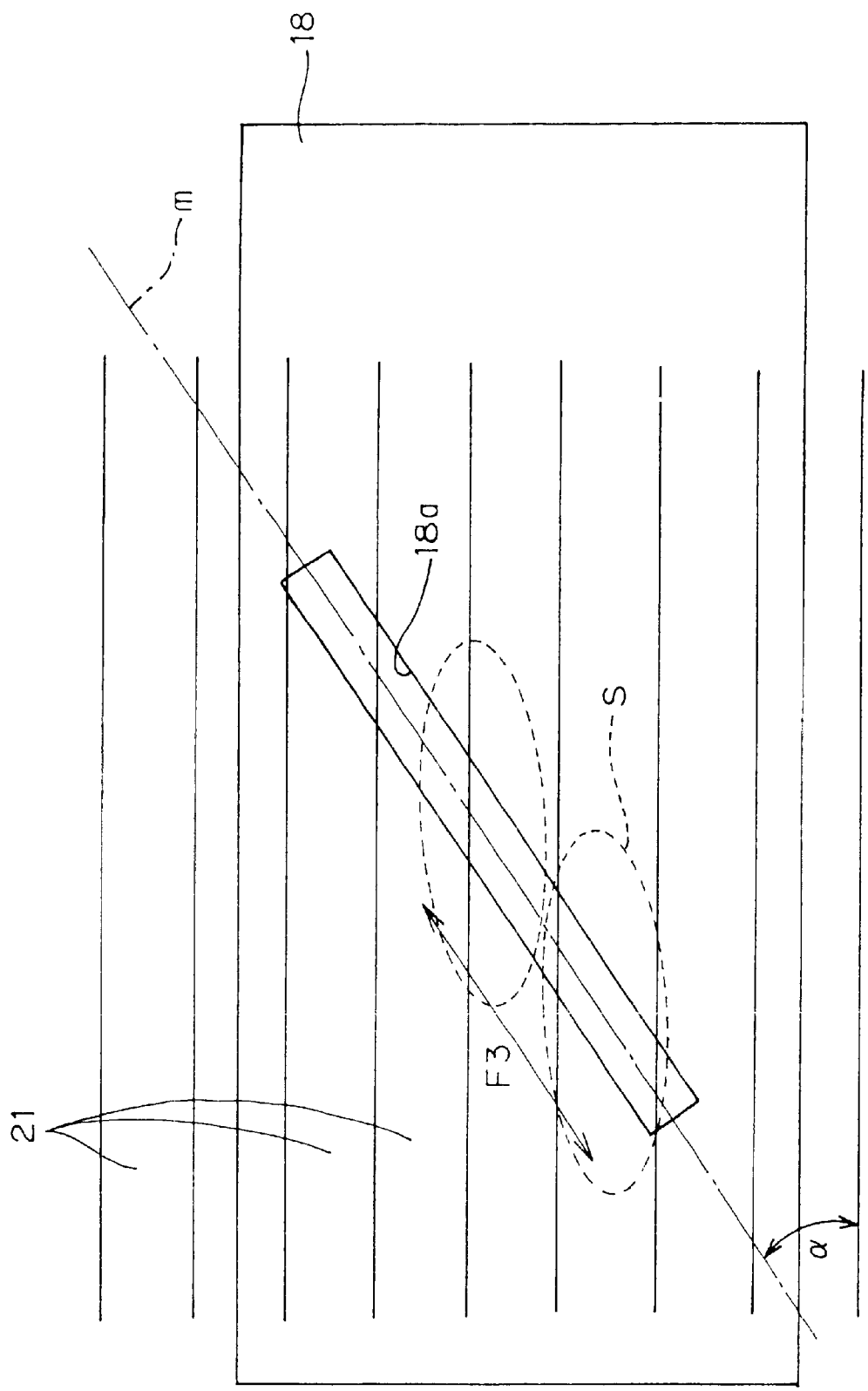
FIG. 4 is a view showing a situation of a condensing spot on a slit of a light shielding film.
Figure 5:
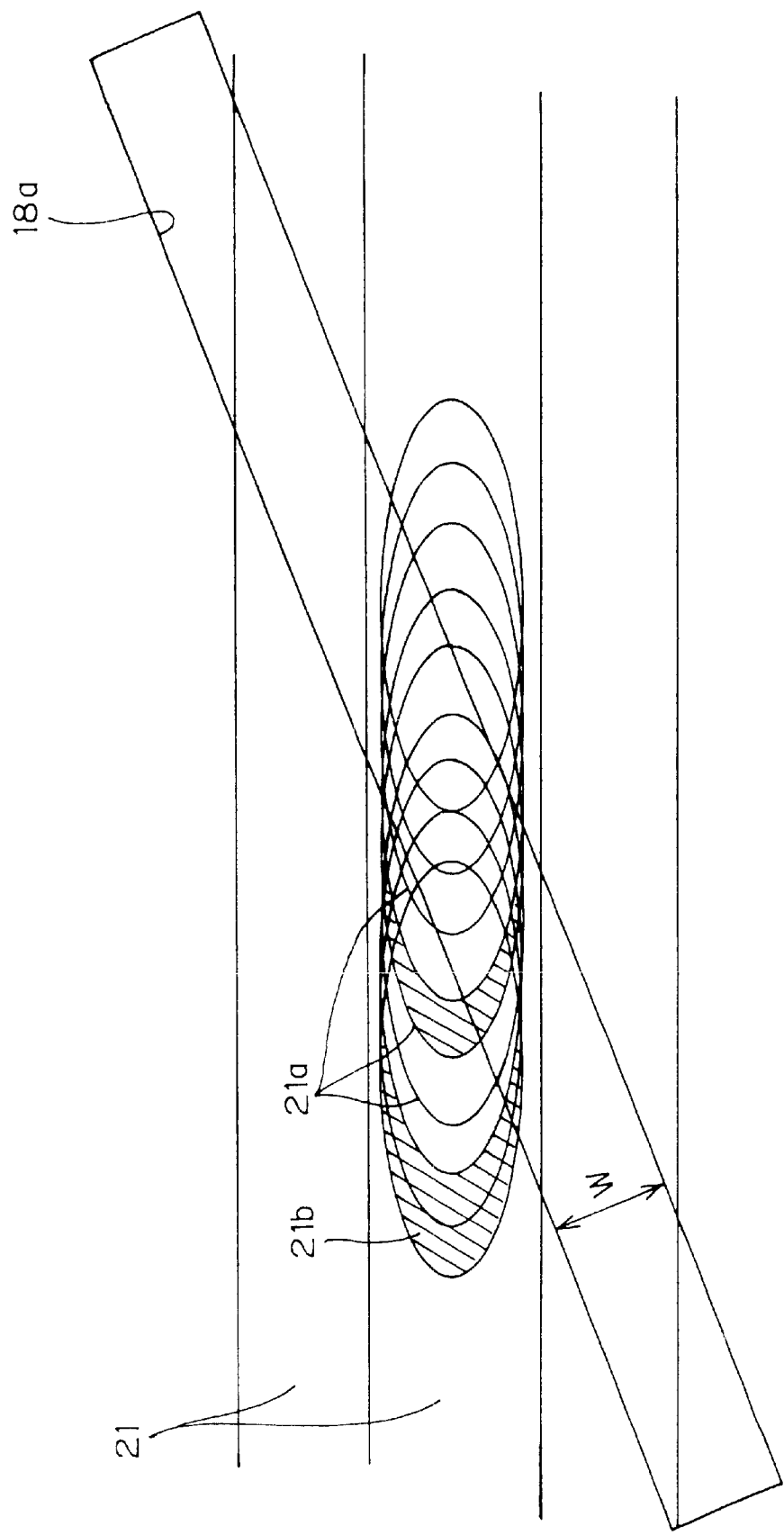
FIG. 5 is a view showing a situation of a mark formed on a magneto-optical disk.

FIGS. 4 and 5 are detailed views of peripheries of the slit 18a of the light shielding film 18, FIG. 4 shows a situation of the condensing spot, and FIG. 5 shows a situation of the mark formed on the magneto-optical disk.

In each of FIGS. 4 and 5, only a portion of a number of tracks 21 provided concentric-circularly on the optical disk is shown, and a boundary between the tracks 21 is indicated by parallel lines. A gap between the tracks 21 and a length of the slit 18a are sufficiently small with respect to a size of the optical disk. Accordingly, it can be considered that the track 21 is sufficiently linear when attention is paid to the periphery of the slit 18a.

In FIG. 4, a center line m of the slit 18a is indicated by a dashed line, and the slit 18a is provided to intersect the track 21 by a predetermined angle α. As described above, the elliptic condensing spot S is formed on the slit 18a, and a major axis of the condensing spot S is parallel to the track 21. In addition, the condensing spot S is rotated and scanned by rotating the galvanomirror shown in FIGS. 1 and 2, moved along the slit 18a as indicated by an arrow F3, and thereby a tracking operation is carried out. In other words, it is not necessary to move the light shielding body during the tracking operation. Moreover, since the condensing spot S is elliptic, even if a position of the condensing spot S is relatively shifted to a certain extent in a width direction of the slit 18a, a quantity of light passed through the slit 18a and radiated onto the optical disk is stable. In other words, since there is a margin in positioning of the condensing spot S, information accessing is stable.

Now, consideration is given to the angle α of intersection between the slit 18a and the track 21.

A track pitch of the track 21 is set to Tp; a focal distance of a condensing optical system composed of the condensing lens 17a and the cylindrical lens 17b to f; and a minimum changing angle for changing an advancing direction of the laser beams L by minimum rotation of the galvanomirror 12 shown in FIGS. 1 and 2 to Δθ. Then, tracking error accuracy C indicating what portion of a moving amount of the condensing spot S by the minimum rotation of the galvanomirror 12 the track pitch Tp is equivalent to, is represented by the following relational equation:

$$C = Tp/(\sin \alpha \cdot f \cdot \Delta\theta) \quad (1)$$

For practical purposes, it is essential that the tracking error accuracy C takes a value of at least 10 or more. Thus, the slit 18a and the track 21 must intersect each other by an angle α, which satisfies the following relational equation:

$$Tp/(\sin \alpha \cdot f \cdot \Delta\theta) \geq 10$$

At present, the track pitch Tp of the magneto-optical disk is about 0.5 μm, the tracking error accuracy C generally requested at present is about 150, the minimum changing angle Δθ by the normal galvanomirror is about 1 sec., and the focal distance f of the normal condensing optical system is about 1 mm. Considering these, it can be understood from the equation (1) that the angle α of intersection between the slit 18a and the track 21 should preferably be 45° or lower. Further, if the angle α is 5° or lower, specifications can be realized, where the track pitch Tp is about 0.1 μm, and the tracking error accuracy C is very high, about 1000. Thus, it is possible to satisfactorily deal with future technical advancements. By setting the angle α in such a manner, tolerance of setting accuracy for optical devices, e.g., the galvanomirror, the condensing lens and the like, constituting the optical head, is high.

Next, description will be made of the recording mark formed on the magneto-optical disk by the light passed through the slit 18a by referring to FIG. 5.

A light radiated onto the magneto-optical disk heats the surface of the magneto-optical disk for each pulse of the laser beam. Then, as a result of influence by a distribution of light intensities in the condensing spot S, the angle α of intersection between the slit 18a and the track 21, a rotational speed of the magneto-optical disk and the like, an elliptic region 21a is set to a predetermined temperature, which enables a polarity to be reversed by a recording magnetic field. Here, the recording magnetic field is generated by the plane coil 19 shown in FIG. 3, and thus a polarity in each elliptic region 21a is set according to a polarity of the recording magnetic field. In addition, a position of the elliptic region 21a is shifted little by little for each laser pulse following the rotation of the magneto-optical disk. If the polarity of the recording magnetic field is constant, the region of the polarity set according to the polarity of the recording magnetic field is extended for each pulse. Then, when the polarity of the recording magnetic field is reversed, the polarity in the elliptic region 21a set to the predetermined temperature by a laser pulse at this point of time is also reversed. As a result, a crescent-shaped recording mark 21b is left, which is indicated by an oblique line in FIG. 5.

The light radiated onto the track 21 of the magneto-optical disk through the slit 18a has the size physically reduced in the track width direction by the slit 18a as described above. Thus, a size of the crescent-shaped recording mark 21b formed on the track 21 in the track width direction is also small, and the track pitch can be narrowed by a corresponding amount to increase a recoding density. As the crescent-shaped recording mark 21b, a mark having longitudinal and horizontal sizes substantially equal to each other is formed.

Most preferably, the foregoing angle α should be set within several degrees, and a track width and a length of a short side of the rectangular slit should be substantially equal to each other, and in the track width direction, a spot size is very small. In a slit longitudinal direction, no losses occur in a quantity of light, and a spot size is not so small. However, a mark size can be reduced by magnetic field modulation. Moreover, even if the spot is roughly moved by the galvanomirror or the like, tracking in the track width direction can be meticulously controlled.

Figure 6:
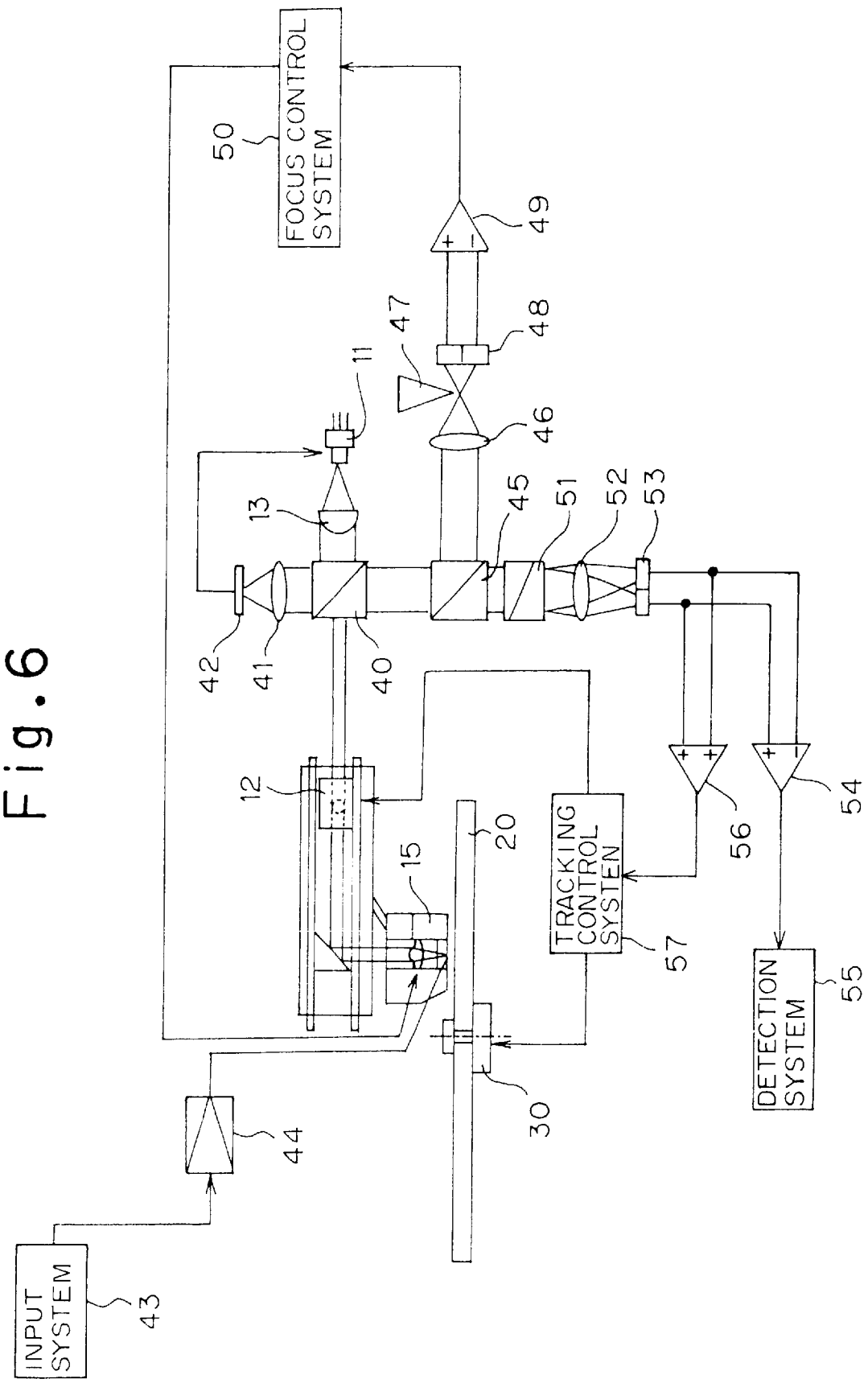
FIG. 6 is a conceptual configuration view showing a control system and the like of the optical information storage device of the embodiment.

FIG. 6 is a conceptual configuration view showing a control system and the like of the optical information storage device of the embodiment.

Beams emitted from the semiconductor laser 11 and set to parallel luminous fluxes by the collimation lens 13 are separated into a transmitted beam and a reflected beam by a polarizing beam splitter 40. The reflected beam is condensed on a photodetector 42 by a condensing lens 41, and used for light quantity monitoring of the semiconductor laser and automatic power control.

The transmitted beam from the polarizing beam splitter 40 is passed through the galvanomirror 12 or the like, and then condensed as an irradiation light on the magneto-optical disk 20 by the condensing optical system loaded on the slider 15.

The slider 15 is provided with the plane coil 19 (see FIG. 3), which generates a recording magnetic field. An input signal corresponding to information recorded in the magneto-optical disk 20 is entered from an input system 43 to a magnetic field modulation driving device 44, and a modulating signal is outputted from the magnetic field modulation driving device 44. When this modulating signal is entered to the plane coil 19, a modulation recording magnetic field is generated. On the other hand, the semiconductor laser 11 emits a laser beam in a pulse shape. The magneto-optical disk 20 is irradiated with the laser beam based on the modulation recording magnetic field, and thus a crescent-shaped recording mark similar to that described above is formed on the magneto-optical disk 20. The formation of such a recording mark enables information to be stored in the magneto-optical disk 20. In this case, it is assumed that when the information is read out, only the laser beam is radiated, and no magnetic fields are generated.

The beam transmitted through the polarizing beam splitter 40 and radiated onto the magneto-optical disk 20 is reflected by the magneto-optical disk 20, further reflected after reaching the polarizing beam splitter 40 again, and then divided into a transmitted beam and a reflected beam by a beam splitter 45.

The beam reflected by the beam splitter 45 is used for detection of a focusing error signal. As a method of detecting such a focusing error signal, a knife-edge method, an astigmatic method, a spot size detecting method, a critical angle method or the like is conceivable, and no problems occur even if any one of these methods is used. FIG. 6 shows the knife-edge method as an example, where the beam reflected by the beam splitter 45 reaches a two-division photodetector 48 through a lens 46 and a knife-edge 47. A signal from the two-division photodetector 48 is detected by a differential amplifier 49, and a focusing error signal is obtained. This focusing error signal is entered to a focus control system 50, and a feedback signal is entered from the focus control system 50 to a not-shown actuator. This actuator drives the condensing lens shown in FIG. 3 in a direction perpendicular to the magneto-optical disk 20.

Here, since the slider 15 is floated with respect to the surface of the magneto-optical disk 20, the focus control system 50 can be omitted by stabilizing a floating amount by proper means.

The beam transmitted through the beam splitter 45 is used for tracking control and signal detection. A polarized component of the beam transmitted through the beam splitter 45 is separated by Wollaston prism 51, and then the beam is passed through a lens 52 to reach a two-division photodetector 53. A signal from the two-division photodetector 53 is detected as a magneto-optical signal by a differential amplifier 54, and entered to a detection system 55. By this detection system 55, the information stored in the magneto-optical disk 20 is obtained.

Regarding a system of providing the foregoing track on the magneto-optical disk 20, here as an example, it is assumed that a system of providing a pre-groove on the magneto-optical disk 20 and using it as a boundary between the tracks is employed. The system of providing such a pre-groove enables the surface of the magneto-optical disk 20 to be smooth. As a result, it is possible to bring the slider 15 sufficiently close to the surface of the magneto-optical disk 20.

Signals from the two-division photodetector 53 are added together by an addition amplifier 56, becoming a sample servo signal intensity-modulated by the pre-groove, and then entered to a tracking control system 57. The tracking control system 57 detects a tracking error signal by sample servo, and the galvanomirror 12 is rotated according to a feedback signal based on this tracking error signal. As a result, a tracking operation is carried out as in the case described above with reference to FIG. 4 or the like. Here, the foregoing seeking operation is also controlled by the tracking control system 57 and, further, a rotational speed of the magneto-optical disk 20 by the medium holding section 30 is also controlled according to the seeking operation.

When the angle α of intersection between the slit 18a and the track becomes smaller, a return beam from the slit 18a becomes weaker. In this case, the sampled servo system is advantageous, which uses a pit pattern for recording track positional information instead of the pre-groove. In this sampled servo system, a servo signal is read as in the normal case of reading a reproducing signal.

By the foregoing configuration, it is possible to realize an optical information storage device, which is large in capacity and high in data transfer speed.

Next, description will be made of an optical head according to another embodiment of the present invention. The optical head described hereinafter is similar to the optical head 10 shown in FIGS. 1 and 2 except for the fact that a slider is different, and can be directly applied as the optical head of the foregoing optical information storage device.

Figure 7:
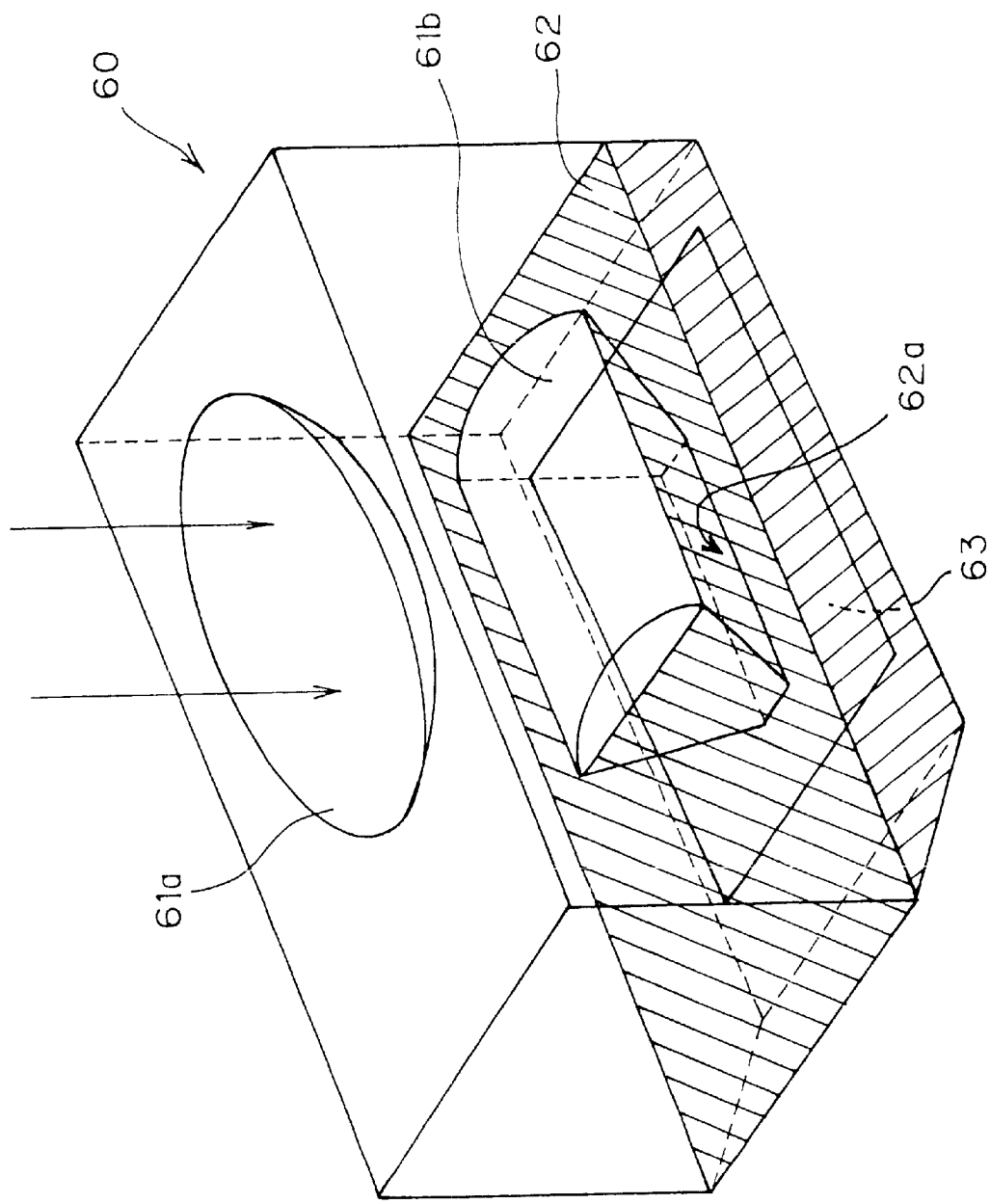
FIG. 7 is a perspective view showing a slider in an optical head according to another embodiment of the present invention.
Figure 8:
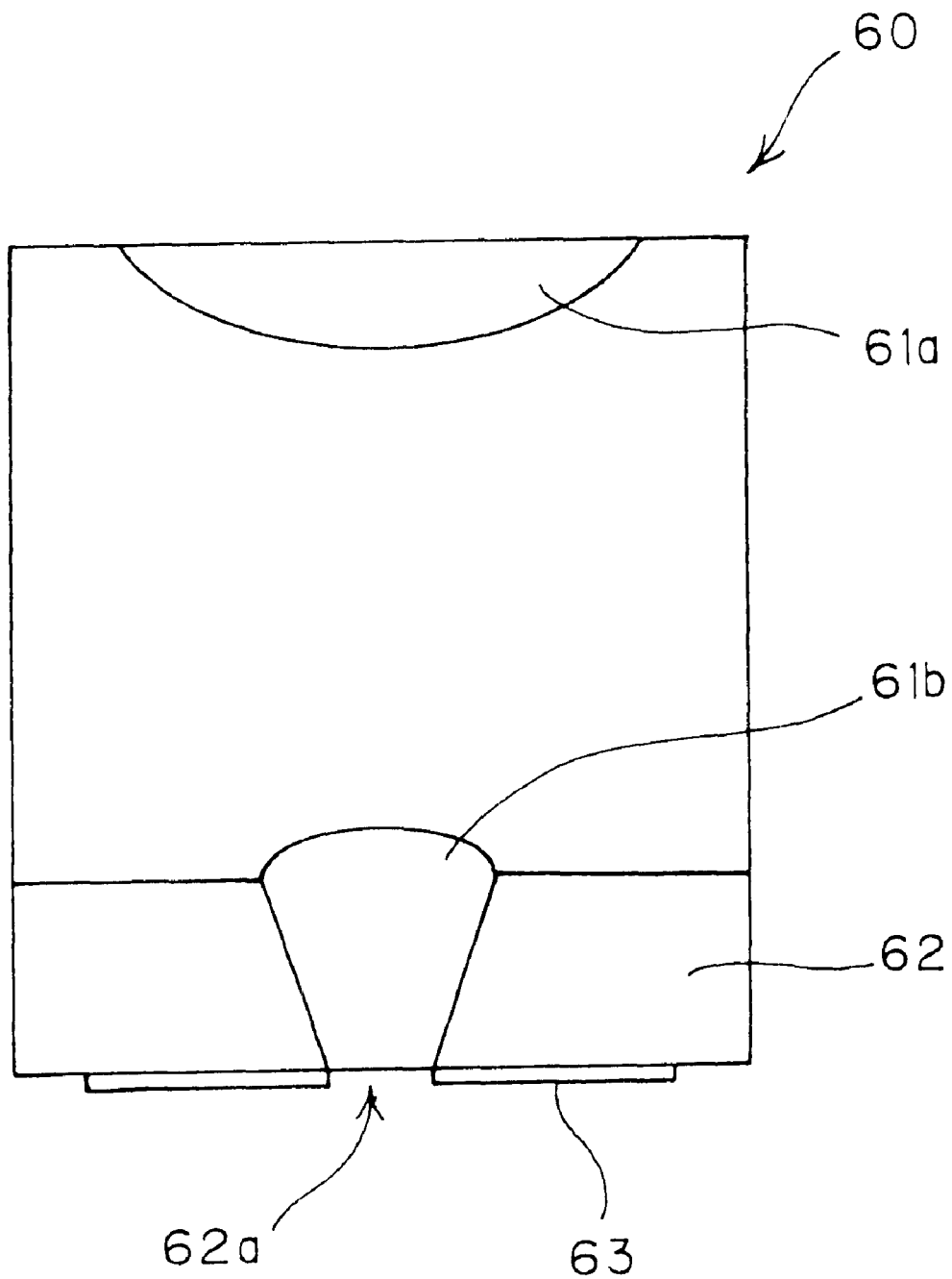
FIG. 8 is a sectional view showing the slider in the optical head of the embodiment of the present invention.

FIG. 7 is a perspective view showing the slider of the optical head of another embodiment of the present invention, and FIG. 8 is a sectional view of the slider.

On this slider 60, a condensing lens 61a and a cylindrical lens 61b are loaded, which constitute an example of condensing means of the present invention.

The slider 60 also includes a light shielding block 62 as an example of a light shielding body of the present invention, and the light shielding block 62 is provided with a slit 62a. In addition, a plane coil 63 is provided around the light shielding block 62.

The light shielding block 62 is made of a silicon crystal. The cylindrical lens 61b is formed by providing the slit 62a in the light shielding block 62 by a photoetching technology or the like, and then laminating a semiconductor material, or the like. However, as the semiconductor material, a material having quality to transmit infrared rays is used and, as a light source, a semiconductor laser for emitting such infrared rays is used. The slider 60 using the above materials can be mass-produced inexpensively by the photoetching technology or the like. As a result, it is possible to reduce costs for the optical head and the optical information storage device.

A situation of forming a condensing spot by the slider 60 is similar to that described above with reference to FIG. 3 and the like, and thus description thereof will be omitted to prevent repetition.

In the optical information storage device and the optical head of the present invention, by shortening the wavelength of the light source, and using silicon of a high refractive index for the cylindrical lens, it is possible to realize a very small recording mark, and high efficiency of light utilization. In addition, by using the LED as the light source, a sufficiently high output can be achieved for the light source, making it possible to realize a high-speed memory at low costs.

Furthermore, the recording medium of the present invention is not limited to the magneto-optical disk, and a magnetic disk using assistance by a laser beam may be used. In the case of such a magnetic disk, information reproducing is performed by using a GMR head or a spin valve head for a magnetic disk. These heads and the foregoing slider can be integrated to be used. Moreover, the recording medium of the present invention may be an optical card using an optical tape, and this optical card has linear parallel tracks.

What is claimed is:

1. An optical information storage device for at least performing information reproducing by irradiating a light on a surface of a recording medium, the recording medium having a track irradiated with the light to at least reproduce information, comprising:

a medium holding section for holding the recording medium in a predetermined position; and
   an optical head for irradiating the light on the surface of the recording medium held by said medium holding section,
   wherein said optical head includes,
      a light source for emitting a light,
      a light shielding body provided with a slit,
      a light shielding body holding section for holding the light shielding body in a position close to/in contact with the surface of the recording medium such that the slit of the light shielding body intersects the track by an angle of 45° or lower,
      condensing means for condensing the light emitted from the light source on the slit of the light shielding body, and
      moving means for moving the light condensed on the slit by the condensing means along the slit.

2. An optical information storage device according to claim 1, wherein the holding section holds the light shielding body such that the slit of the light shielding body intersects the track by an angle of 5° or lower.

3. An optical information storage device according to claim 1, wherein the condensing means of said optical head condenses the light to be in a long elliptic shape in a direction parallel to the track of the recording medium.

4. An optical information storage device for at least performing information reproducing by irradiating a light on a surface of a recording medium, the recording medium having tracks provided at predetermined intervals and irradiated with the light to at least reproduce information, comprising:

a medium holding section for holding the recording medium in a predetermined position; and
   an optical head for irradiating the light on the surface of the recording medium held by said medium holding section,
   wherein said optical head includes,
      a light source for emitting a light,
      a light shielding body provided with a slit,
      a light shielding body holding section for holding the light shielding body in a position close to/in contact with the surface of the recording medium such that the slit of the light shielding body intersects the tracks by an angle of 45° or lower,
      condensing means for condensing the light emitted from the light source on the slit of the light shielding body,
      moving means for moving the light condensed on the slit by the condensing means along the slit by changing an incident angle of the light made incident on the condensing means, and
      a following relationship is established among an interval Tp between the tracks, a focal distance f of the condensing means, a minimum changing amount $\Delta\theta$ of angle changed by the moving means, and an angle α of intersection of the slit with respect to the tracks:

$$Tp/(\sin \alpha \cdot f \cdot \Delta\theta) \geq 10.$$

5. An optical head comprising:
   a light source for emitting a light;
   a light shielding body provided with a slit for guiding the light to a surface of a recording medium;

condensing means for condensing the light emitted from said light source on the slit of said light shielding body; and moving means for moving the light condensed on the slit by said condensing means along the slit.

6. An optical head according to claim 5, wherein the slit provided in said light shielding body has a width set equal to or less than ½ of a wavelength of the light emitted from said light source.

7. An optical head according to claim 5, further comprising a coil provided close to the slit of said light shielding body to generate a magnetic field.

* * * * *